US007644508B1

(12) United States Patent
Schmitz

(10) Patent No.: US 7,644,508 B1
(45) Date of Patent: Jan. 12, 2010

(54) RETROFIT RECESSED LIGHTING INSTALLATION TOOL

(76) Inventor: Andrew Schmitz, 1171 Spectrum, Irvine, CA (US) 92618

( * ) Notice: Subject to any disclaimer, the term of this patent is extended or adjusted under 35 U.S.C. 154(b) by 44 days.

(21) Appl. No.: 12/117,104

(22) Filed: May 8, 2008

(51) Int. Cl.
G01B 5/00 (2006.01)
G01B 5/18 (2006.01)
(52) U.S. Cl. .................................. 33/542; 33/DIG. 10
(58) Field of Classification Search .................. 33/528, 33/542, 543, 546, 783, 833, DIG. 10; 52/105
See application file for complete search history.

(56) References Cited

U.S. PATENT DOCUMENTS

| 2,992,488 | A |   | 7/1961  | Berrett |         |
|-----------|---|---|---------|---------|---------|
| 3,274,692 | A |   | 9/1966  | Morrison|         |
| 4,096,964 | A | * | 6/1978  | Glick ............................ | 33/528 |
| 4,332,088 | A |   | 6/1982  | Cowman  |         |
| 5,292,210 | A |   | 3/1994  | Nowick  |         |
| 5,357,683 | A | * | 10/1994 | Trevino ........................ | 33/528 |
| 7,559,150 | B2| * | 7/2009  | Fernandez .................... | 33/512 |
| 2005/0081396 | A1 | * | 4/2005 | Coulombe .................... | 33/542 |
| 2007/0022617 | A1 | * | 2/2007 | Wilkinson et al. ............ | 33/542 |

\* cited by examiner

Primary Examiner—G. Bradley Bennett

(57) ABSTRACT

The present invention is a device for determination of the presence of an installation space behind a ceiling covering for a retrofit recessed lighting fixture by way of a small probe hole. Specifically, the invention device comprises an longitudinal rotation handle with a top end and a bottom end defining a handle axis. Extending from the top end along the handle axis lies a first section of a narrow probe rod. The height of the first section exceeds the height of a retrofit recessed lighting fixture to be installed by at least the thickness of a ceiling covering through which it will be installed. At the end of the first section extends a second section perpendicular to the first section, where the second section comprises an insertion end which is pointed so that it can be pressed through the ceiling covering material to probe the space behind it.

15 Claims, 5 Drawing Sheets

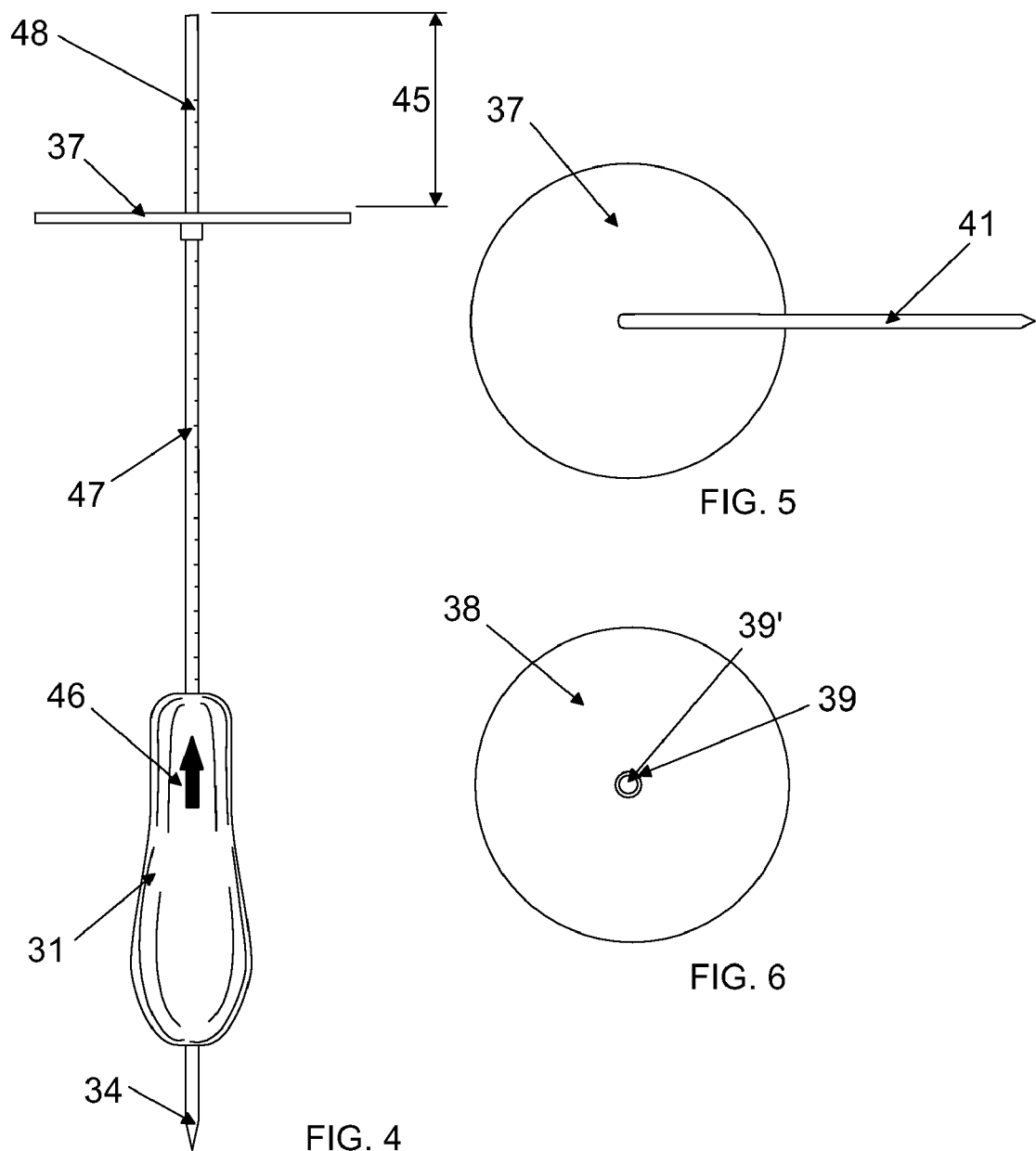

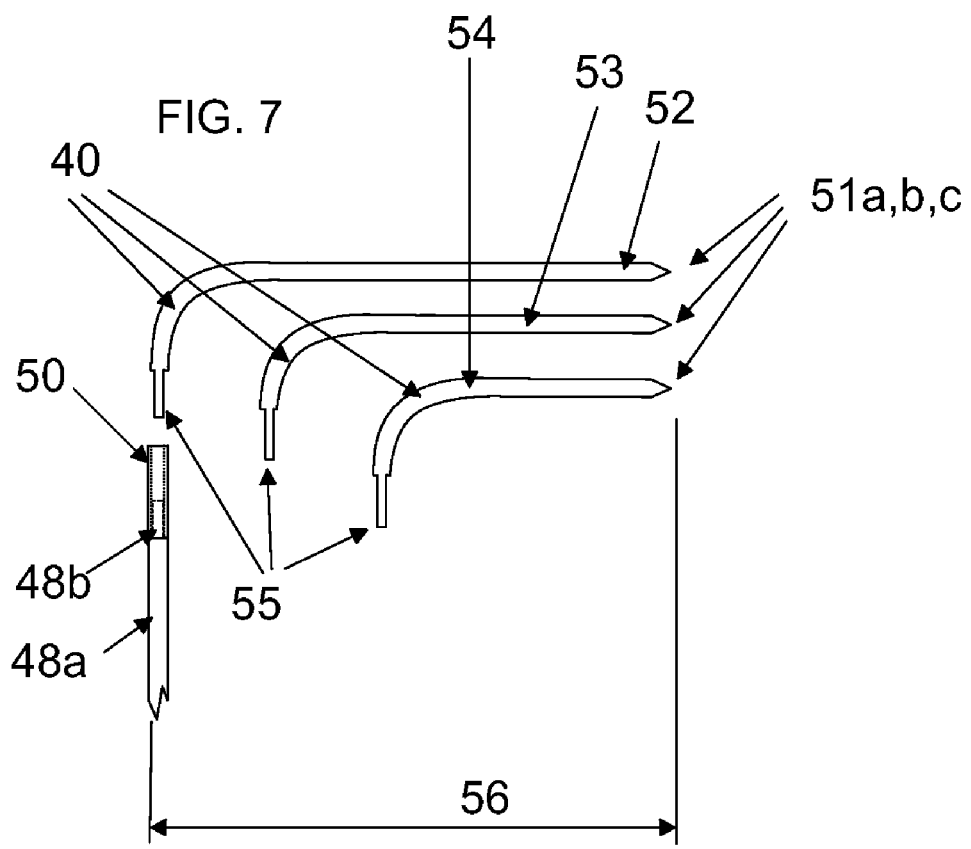
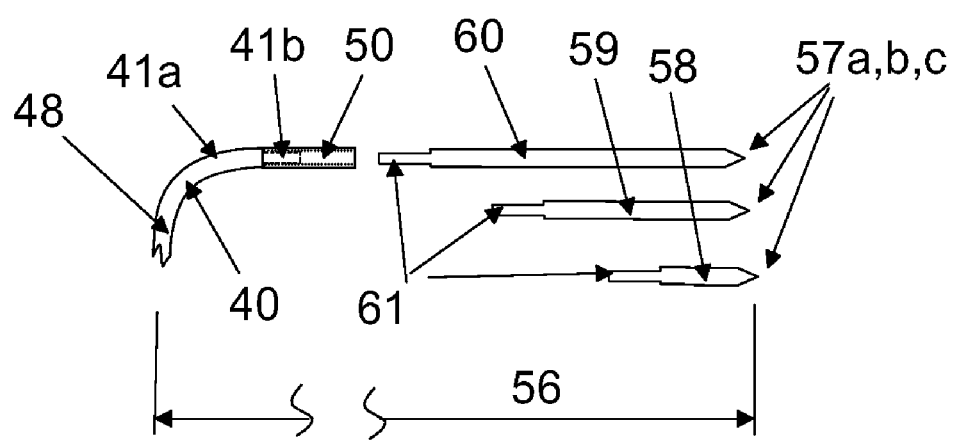

RETROFIT RECESSED LIGHTING INSTALLATION TOOL

FIELD OF THE INVENTION

The present invention relates to retrofit recessed lighting installation, particularly those tools assisting an installer in installation of a recessed lighting fixture.

BACKGROUND OF THE INVENTION

The current housing market is dramatically depressed, in that many owners find themselves paying for a home which is worth much less than they paid for it. Such owners search frantically for improvements which have a relatively low purchase, installation and operating cost, whereafter installation they provide a multiplier in improving property value over such cumulative costs. The field of such net value-increase improvements is small. In such a small field, the pressure to reduce purchase, installation or operating costs is intense as home (and even investment and commercial property) owners search for a lowest overall cost for the greatest property value increase.

Among the small field of home improvements which have been found to dramatically affect a purchaser's favorable impression of a home or commercial property is recessed lighting. A properly designed system of recessed lighting can leave undesirable or difficult to decorate areas of a room in relatively low light while focusing a virtually unnoticeable light source on features which a purchaser is likely to desire. Purchase cost of recessed lighting fixtures has plummeted in recent years as high quality, inexpensive import fixtures have become available. However, installation costs have remained relatively high. Part of the installation cost is for professional skill in designing and choosing equipment for a recessed lighting system, which is necessarily time intensive and interactive between the lighting designer and the owner. Making efficient use of this design activity is essential to the owner. A critical aspect of that design process is regularly overlooked. This failure often causes re-design and/or unfavorable actual installation results.

The source of that failure is a necessary part of installation of retrofit recessed lighting. It is well known that original installation and retrofit installation recessed lighting fixtures are so different in design that they are instantly recognizable by those skilled in the art of their installation. Original installation recessed lighting fixtures are intended to be secured between and to parallel ceiling joists or their equivalent ceiling supports for wood planks, wood panels, drywall, sound panels, or other ceiling coverings which hide an underside of a roof or next-story floor from the occupants of a room. The fortunate installers of original installation fixtures can accomplish this installation before the ceiling coverings are put in place.

As such, original installation recessed lighting fixtures are provided with four parallel, extendable arms which extend horizontal to a downward directed "can" or cylindrical body of a housing of a recessed lighting fixture. The arms are extended until their ends abut two parallel ceiling joists, whereafter they are fixed by screws or nails to those support beams. It is left to the installers of the ceiling coverings to provide a circular opening in precisely the correct location so that the downward directed "can" opening is accessible through the ceiling covering. The opening provided in the ceiling covering for recessed lighting has a relatively small tolerance as to diameter and location relative to the "can" opening. A ring-shaped "trim" element provides decorative flashing about a short cylinder which is removably attached to a lower end of the housing in order to cover a space between the edge of the opening in the ceiling covering the lower edge of the "can" that extends near to it. The opening in the ceiling covering must be small enough and located close enough to the lower end of the "can" that the flashing of the "trim" piece can extend substantially farther than the periphery of the opening in the ceiling covering.

In a retrofit circumstance, recessed lighting must be installed entirely through the relatively small opening made in the ceiling covering or panel, which must be identical with the opening that would have been made at an original installation for the same product. Making the opening larger is generally not an economic option. A recessed lighting design typically requires installation of several recessed lighting fixtures in a single room to accomplish the desired lighting effect. First, ceiling covering materials may be of a type that cannot be practically repaired if the opening is made too large, i.e., in the case of wood plank or wood paneling. Second, the cost of repairing a ceiling covering to precisely the texture and coloring of adjacent materials is always difficult or, for some owners, impossible according to their desires. Thus, the retrofit recessed lighting fixture housing and electrical connection structures must be capable of being inserted into an opening of precise circular diameter in a location specific to the lighting effect to be accomplished. Very little variance in the location of the opening is permitted because the lighting effect of a fixture installed offset from a specified position could be visually disturbing and require later major demolition and repair to fix the problem.

While the need for specificity of the location of the openings for recessed lighting fixtures in a unified retrofit design are well known, the locations are generally made without determination of location of studs, joists, pipes, conduit, wires, fiber optic strands, cross-supports, insulation, departures from standard construction, and other structures hidden by the ceiling coverings. If these structures cannot be removed or economically manipulated through a standard retrofit opening to accommodate the installation, the location of the opening must be moved, often to the detriment of the lighting design.

It is well known in the prior art to make a hole one half to one inch in diameter in ceiling coverings to allow visual inspection of a space above the ceiling covering to determine whether there is sufficient space for a retrofit installation. A hole of this size cannot be made at the design stage, in that it cannot be repaired so that it is unnoticeable to the owner. The locations of the retrofit lighting fixtures must have been pre-determined for that reason. An installer must be as certain as possible using sonic or magnetic stud finders as to the location of studs immediately adjacent to the ceiling covering that the recessed lighting fixture. This determination does not provide information about other unseen structures that will prevent installation at a specific site. A device for making retrofit openings is disclosed in U.S. Pat. No. 5,292,210.

The prior art has described devices for finding the distance from a small probe hole to studs within a space behind drywall. The small probe holes are those which would be capable of being repaired to a substantially unnoticeable state after a probe of the hidden space behind the drywall is made. Such devices are disclosed in U.S. Pat. Nos. 2,992,488, 3,274,692, and 4,322,088. These devices suffer from a number of difficulties in actual use. The device of the '488 patent cannot be used with any precision to determine a distance from the probe hole to a stud, in that it cannot be maintained in a precise normal relationship to the exterior drywall surface. Such precision is required for retrofit openings for recessed lighting.

The device of the '392 patent provides for providing assurance that the normal angle is maintained but is limited to finding a stud distance at a single elevation from a rear side of a drywall. Further, it is difficult to maintain in a fully engaged position against an outside surface of the drywall. The device of the '088 patent also suffers from these deficiencies.

There is a need for a device which is capable of determining obstruction of any structure which will interfere with a retrofit installation of a recessed lighting fixture, i.e., in a space hidden behind a ceiling covering which may be intersected with studs, joists, pipes, conduit, wires, fiber optic strands, cross-supports, insulation, departures from standard construction, and other structures hidden by the ceiling coverings.

SUMMARY OF THE INVENTION

The present invention is a device for determination of the presence of an installation space behind a ceiling covering for a retrofit recessed lighting fixture by way of a small probe hole. Specifically, the invention device comprises an longitudinal rotation handle with a top end and a bottom end defining a handle axis. Extending from the top end along the handle axis lies a first section of a narrow probe rod. The height of the first section exceeds the height of a retrofit recessed lighting fixture to be installed by at least the thickness of a ceiling covering through which it will be installed. At the end of the first section extends a second section perpendicular to the first section, where the second section comprises an insertion end which is pointed so that it can be pressed through the ceiling covering material to probe the space behind it.

The thickness of the probe rod is preferably less than 3 millimeters and more preferably less than or equal to 2 millimeters. The first section comprises length measurement indications whereby a user, after inserting the second section into a probe hole, turning the device 90 degrees, and continuing to insert the first section, will be able to appreciate the distance between the elevation of the second section above an inside surface of the ceiling covering. Further, a normalization plate is slidably fixed to the first section maintaining a plane of its upper surface in a relationship perpendicular to the first section so that, as the first section is inserted into the probe hole, the first section is easily maintained at an angle perpendicular to the outside surface of the ceiling covering. It is this surface which provides the reference critical to location of the periphery of the lower opening of the "can" of the housing of the lighting fixture and, thereby, the space required for installation above said ceiling covering. The prior art as to insertion of narrow probes has been concerned with finding studs for nailing or fixing objects, a field of prior art which has been obviated by magnetic and sonic stud detectors. The present invention provides for determination of an installation space in the following manner.

A user, having inserted the probe rod so that the normalization plate maintains the first section normal to the outside surface of the ceiling covering, can observe on the first section measurements the elevation of the second section above the inside and surface of the ceiling covering. The second section length is fixed at a radius of the required installation cylindrical space for a retrofit recessed lighting fixture. A user grasps said rotation handle and rotates the device about the handle axis. If no resistance is encountered, the user further inserts the first section at pre-determined increments and repeats the rotation motion until the first section is inserted to the required height of the lighting fixture. If no resistance is encountered, an installer and the interacting designer can be assured that a lighting fixture can be retrofitted to that specific location. If resistance is encountered indicating that unseen structures will prevent installation, the design can be adapted before any lighting fixtures are actually installed. Any probe hole can be quickly and inexpensively repaired by use of wallboard compound or wood putty, although other well known patching means could be used.

Experienced contractors and installers are very familiar with the types of structures that could intersect with or intrude upon the required cylindrical installation space required for the lighting fixture. All those well known structures have unique external configurations and flexural characteristics which can be determined by pushing, sliding, and rotating the second section and its point against the unseen structures. For example, pipes and structural beams will resist all pushing and manipulation so that their external surfaces can be non-visually examined. Unseen wires and conduit can be pressed and manipulated to determine whether they can be pressed aside to complete an installation. Further, the structure of the second section can be adapted to provide additional information about structures encountered in rotational searches of the hidden ceiling spaces. A portion of the section may comprise a spring which deflects only upon unacceptable resistance by a hidden structure, whereby an installer may find acceptably movable structures in the installation space by rotating the second section against them.

In yet another embodiment of the second section, a relatively short extension support part extends from the end of the first section. A user will select one of two or more radius extensions to removably fix to the extension support, which extends the effective length of the extension support to a desired radius of the installation space. The user then proceeds with the rotation determination of the installation space as above. Another form of extending the extension support is a connection box extension, which may be straight or formed with one or more angled extensions to determine whether an adjacent stud or ceiling support has space adjacent to it for installation of a connection box of the retrofit lighting fixture. It is well known that retrofit lighting fixtures most often comprise an extension from their housing of a section of conduit to an electrical connection box for protection of electrical wires from a light socket in the fixture housing. The connection box is preferably mounted on an stud in a convenient location by way of the flexible conduit section. Afterward, the fixture housing is fixed to the ceiling covering by way of clips or other means and thereafter the trim is installed for a finished lighting installation. Electrical connection to live circuits is accomplished before fixing the housing to the ceiling covering.

In yet another embodiment of the invention, a directional indication is made on the rotation handle and/or the normalization plate showing the current direction of the second section. Said directional indication is preferably a line or mark located on an upper part of the handle opposite the direction of the second section so that a user can appreciate the direction of the second section when it is inserted into the installation space.

In yet another embodiment of the invention, a hole forming pin is fixed along the handle axis extending down from the lower end of the handle. It's length is only slightly greater than the thickness of the ceiling materials and is used to form a probe hole for the upper sections of the invention. As such, the diameter of the first and second sections can be substantially reduced so that they are not needed for formation of the probe hole and the diameter of the hole forming pin is accordingly slightly increased. To reduce the repairable damage done to sensitive ceiling materials, the hole forming pin is made in "+" sign cross section, thereby causing the probe hole to be defined by four triangular and somewhat resilient thicknesses of the ceiling covering. Such a probe hole will tend to self seal when the upper sections are withdrawn after use, improving the visual appearance of any subsequent repair.

Accordingly, it is an object of the present invention to provide an improved device for locating accurately an installation space for a retrofit lighting fixture.

A further object is to provide such a device which requires making a very small and easily repairable probe hole.

BRIEF DESCRIPTION OF THE DRAWINGS

FIGS. 4 and 5 are, respectively, rear and top views of the probe of FIG. 3.

FIG. 6 is a top view of a normalization plate of the probe of FIG. 3.

FIG. 7 is a side view of an alternate terminal structure showing a kit of three replaceable tips for the probe of FIG. 3.

FIG. 8 is a side view of yet another alternate terminal structure showing a kit of three replaceable tips for the probe of FIG. 3.

DETAILED DESCRIPTION OF THE INVENTION

The invention is now discussed with reference to the figures.

Figure 1:
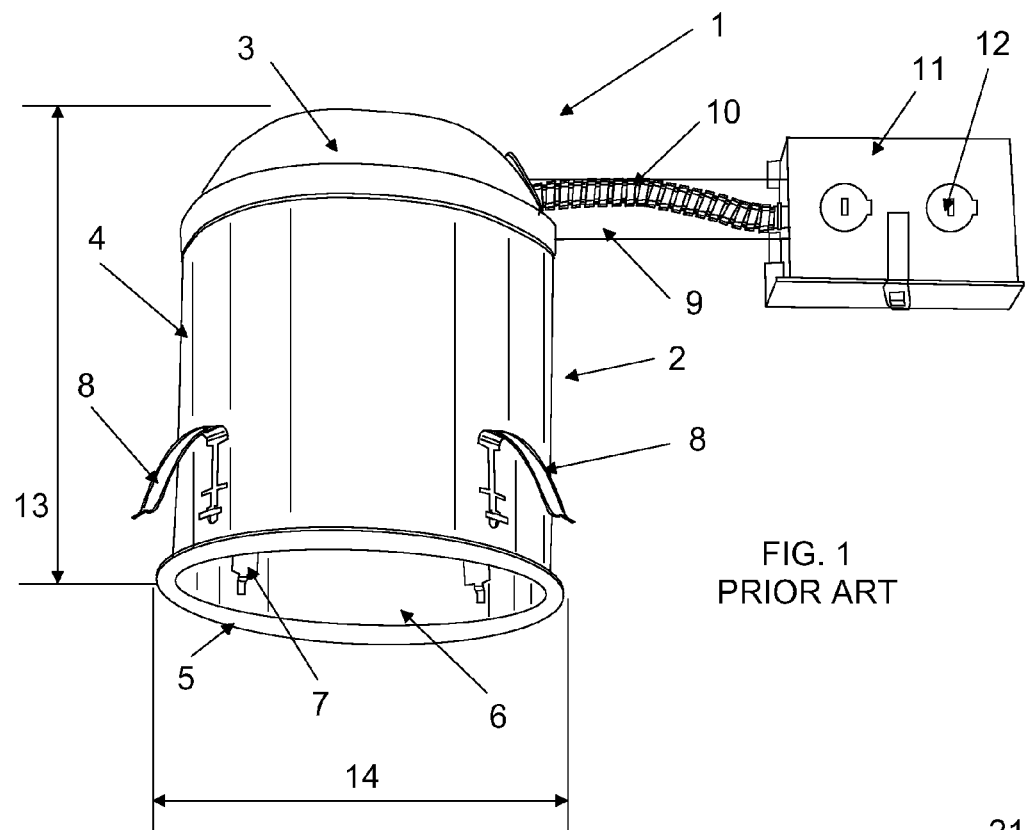
FIG. 1 is a bottom and side view of a prior art retrofit lighting fixture.

FIG. 1 is a bottom and side view of a prior art retrofit lighting fixture 1 comprising a "can" housing 2 and an extending electrical conduit 10 with lateral support 9 connecting with an electrical connection box 11 having means 12 for connecting live circuit wires with those running from the box 11 to housing 2. Box 11 further comprises well known means for fixing it to an adjacent stud or ceiling support. Housing 2 comprises a dome top section 3 which generally encloses a light socket therein, a cylindrical section 4 extending down to a rim 5, defining therein the space 6 and having an internal wall bearing clips 7 for receiving and releasably fixing a cylindrical portion of a trim piece (not shown). Clips 8 extend from the sides of section 4 to support the housing 2 from a top surface of a ceiling covering so that it is directed downward when installed. An insertion opening diameter 14 must be made in said ceiling covering to accommodate retrofit insertion of the entire assembly of fixture 1 above it. An installation space having the dimensions of height 13 and diameter 14 must be available as a minimum requirement above said ceiling covering for installation of fixture 1. Retrofit fixtures 1 all comprise at least housing 2. Conduit 10 and box 11 are generally capable of being located in an appropriate location once installation space is determined to be available.

Figure 2:
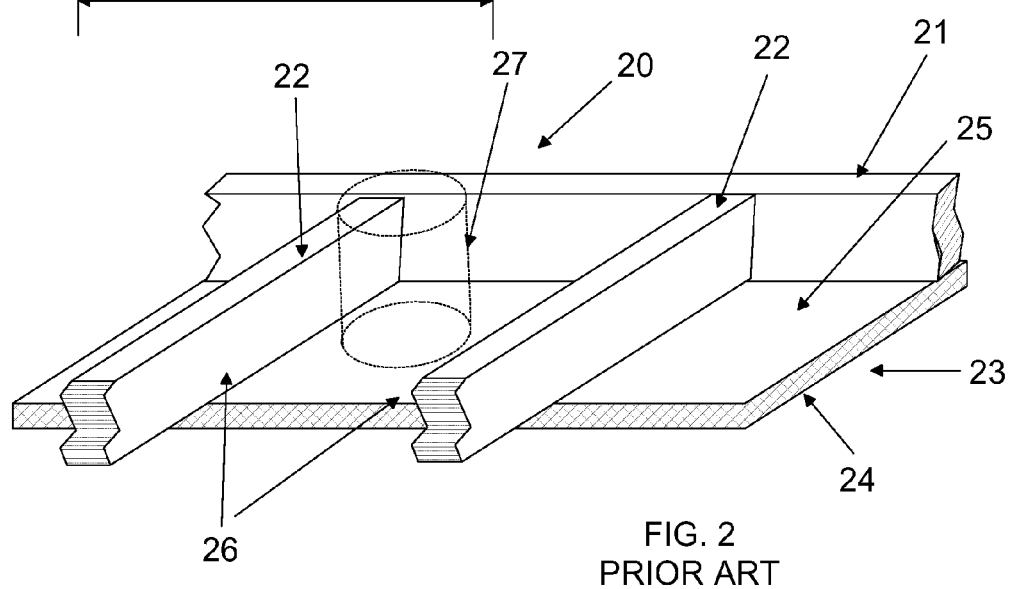
FIG. 2 is a top and perspective prior art view of a stud-enclosed space above a ceiling covering wherein the invention is used to determine installation space for a retrofit lighting fixture.

FIG. 2 is a top and perspective prior art view of ceiling area 20 defining a stud-enclosed space 26 above a ceiling covering 23 wherein the invention probe is used to determine installation space 27 for a retrofit lighting fixture as described in FIG. 1. FIG. 2 shows that space 26 is sufficient for an installation of a retrofit fixture by way of inspection of installation space 27. Space 26 is bounded by top surface 25 of covering 23, cross studs 22 and main stud 21. An underside 24 is accessible to an installer of a retrofit fixture such studs 21 and 22 and all other interfering structures must be determined before installation may proceed.

Figure 3:
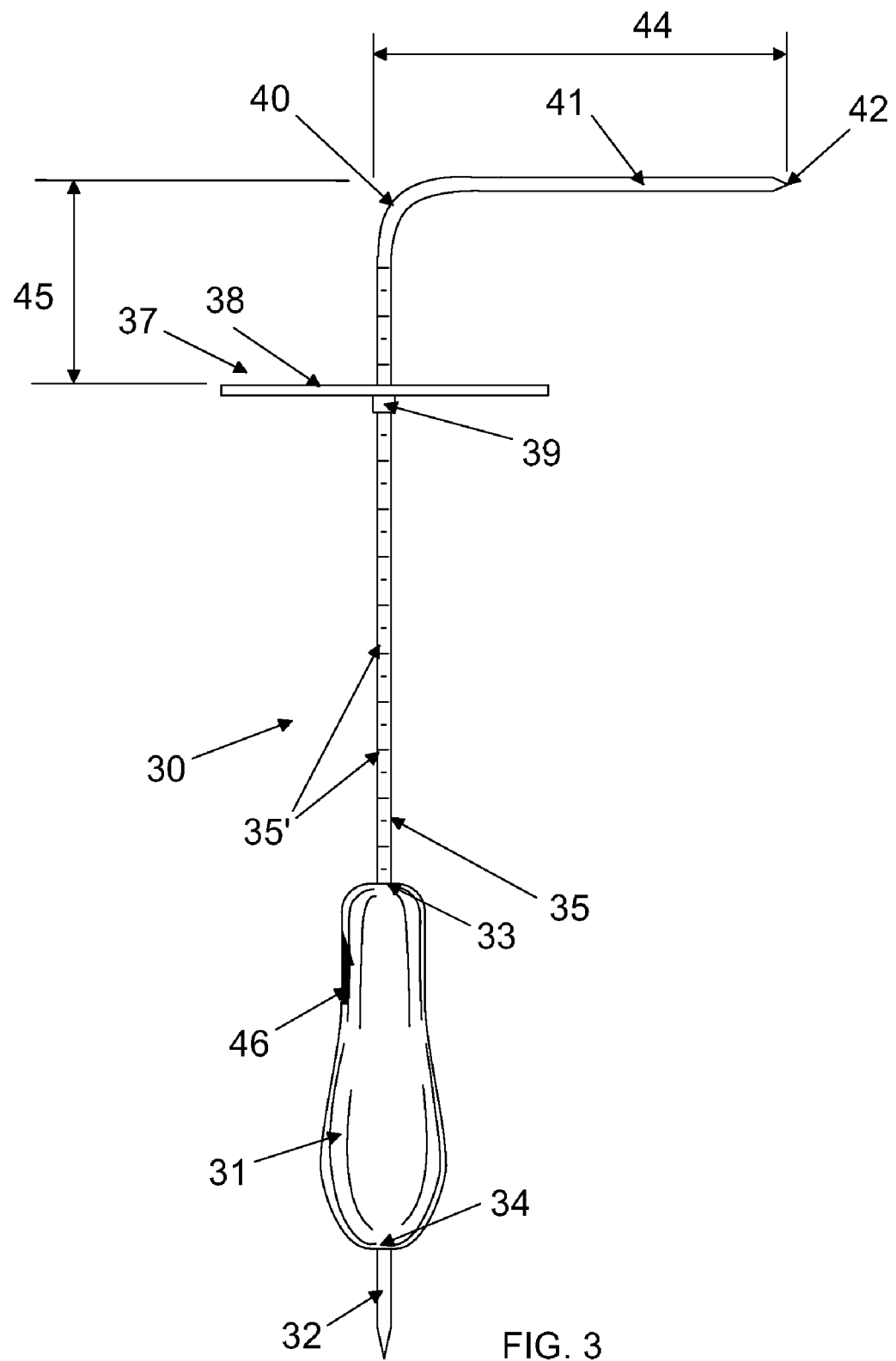
FIG. 3 is a side view of invention space determination probe.

FIG. 3 is a side view of invention space determination probe 30 comprising a handle 31 with a top end 33 and bottom end 34 defining a rotation axis above and below handle 31. Extending down from end 34 is hole forming pin 32, which is preferably limited in length to about 1 to 2 inches and has a pointed end so that a user can turn probe 30 upside down and impress pin 32 into ceiling covering material to form a hole therethrough. Said hole is used for insertion and rotation of a probe rod comprising a first section 35 extending upward from end 33 along the rotation axis bearing indicia 35' of length measurements such as inches and their subdivisions so that a user will be able to determine the elevation 45 of first section 35 and second section 41 above a top surface of normalization plate 37, which is made to lie flat against an underside of a ceiling covering when the probe is in use. Such action causes first section 35 to be maintained perpendicular to the underside of a ceiling covering when detecting adequate installation space above the ceiling covering. Plate 37 comprises a preferably round and transparent (such those formed with acrylic polymer) section 38 defining a center hole which extends down through a guide cylinder 39 extending down from an underside of section 38. The center hole is of very close tolerance about the surface of the first section 35 so that the objects of invention are obtained as to maintenance of the perpendicularity of the first section 35 during space probing above ceiling coverings.

Second section 41 extends perpendicular to first section 35 by way of radius transition 40, which is curved to minimize expansion of the above mentioned insertion hole. Second section 41 preferably ends in point 42 for forming the insertion hole or for moving through an insertion hole smaller in diameter than the second section. Lateral probe distance 44 is that distance from point 42 to the rotation axis of the handle 31. This distance 44 is equal to or greater than a radius of an installation diameter of an installation space for a retrofit fixture.

In use, probe 30 is moved from the vertical position shown in FIG. 3 to a horizontal position so that point 42 can be inserted into an insertion hole. A user presses upward in the area of transition 40 until that section passes through the insertion hole and the first section can be brought into a vertical position. A user will have raised plate 37 to a topmost position on first section 37 and causes it's upper surface to lie flat against an underside of the ceiling covering. The user rotates the handle about the rotation axis, determining if there any interfering structures above the ceiling covering at a lowest elevation of the second section 41 within a space being probed for adequacy as an installation space. Upon determination of a lack of such interfering structures or determination of a likely size, type and location of such structures within the plane of rotation at the lowest level, the user presses upward on handle 31 in small increments and repeats the process of rotation and mapping of (or lack of) interfering structures. When a user notes that a top of a potential installation space has been reached with reference to the elevation indicia 35', the user can withdraw probe 30 and decide whether adequate installation space is available about the rotation radius away from the rotation axis above the ceiling covering.

FIGS. 4 and 5 are, respectively, rear and top views of the probe of FIG. 3. FIG. 4 shows a form of second section direction mark 46, showing when in rotating handle 31 the direction in which second section 41 is pointing.

FIG. 6 is a top view of a normalization plate of the probe of FIG. 3 showing center hole 39'.

FIG. 7 is a side view of an alternate terminal structure showing a kit of three replaceable tips 51 *a,b,c* for the probe of FIG. 3, wherein an upper end 48*a* ends in a reduced diameter end 48*b*, which engages bored cylinder 50 to maintain approximately the same diameter as the rest of the first section. Transitions 40 extend up from reduced ends 55, which are adapted to be inserted into the bore of cylinder 50. When tips 51 *a, b* or *c* are inserted into cylinder 50 they remain fixed at a radial angle perpendicular to the rotation axis and define one of three radii for well established retrofit fixtures. For example, tip 51*a* is the longest and provides for probing of an installation space with distance 56. A user then only need carry these three tips and can determine installation space availability for all standard retrofit fixtures. If a larger fixture space is not available, a user can quickly change a tip and determine if the next smallest fixture size can be accommodated.

FIG. 8 is a side view of an alternate terminal structure showing a kit of three replaceable tips 57 *a,b,c* for the probe of FIG. 3, wherein an upper end 48 extends to transition 40 and ends in a reduced diameter end 41*b* of section 41*a*, which engages bored cylinder 50 to maintain approximately the same diameter as the rest of the first section. Sections 58, 59 and 60 extend from an end point to reduced ends 61, which are adapted to be inserted into the bore of cylinder 50. When tips 57 *a, b* or *c* are inserted into cylinder 50 they remain fixed at a radial angle perpendicular to the rotation axis and define one of three radii for well established retrofit fixtures. For example, tip 57*a* is the longest and provides for probing of an installation space with distance 56. A user then only need carry these three tips and can determine installation space availability for all standard retrofit fixtures. If a larger fixture space is not available, a user can quickly change a tip and determine if the next smallest fixture size can be accommodated.

Figure 9:
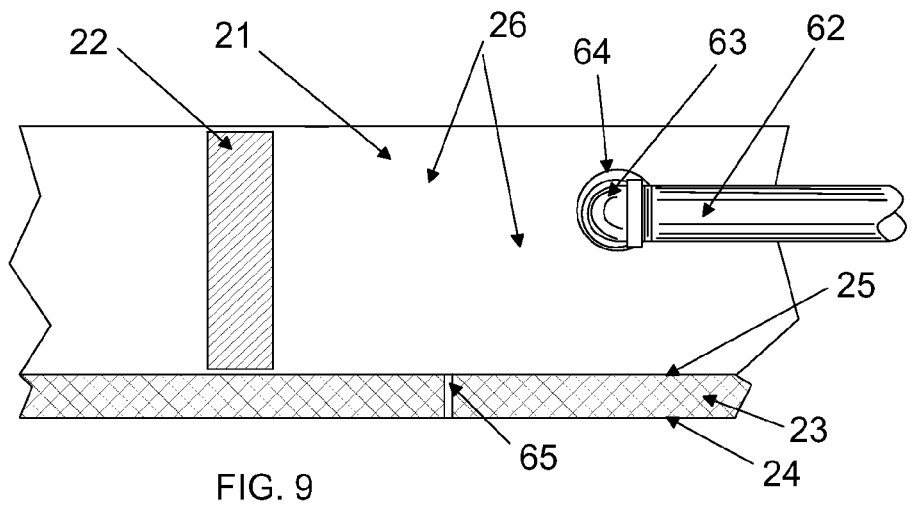
FIG. 9 is a side and cutaway view of the ceiling structure shown in FIG. 2 including a representative interfering structure.

FIG. 9 is a side and cutaway view of the ceiling structure shown in FIG. 2 including a representative interfering structure 62. Structure 62 is a threaded pipe with an elbow 64, whose other extension into the page passes through opening 64 in stud 21. An insertion hole 65 has been formed in material 23 for insertion of the invention probe rod. The locations of studs 21 and 22 have been previously established by a user by use of magnetic or sonic stud finders so that these are unlikely to be interfering structures for an installation space, i.e., the insertion hole 65 is made equal to or greater than an installation radius distance from the sides of said studs 21 and 22.

Figure 10:
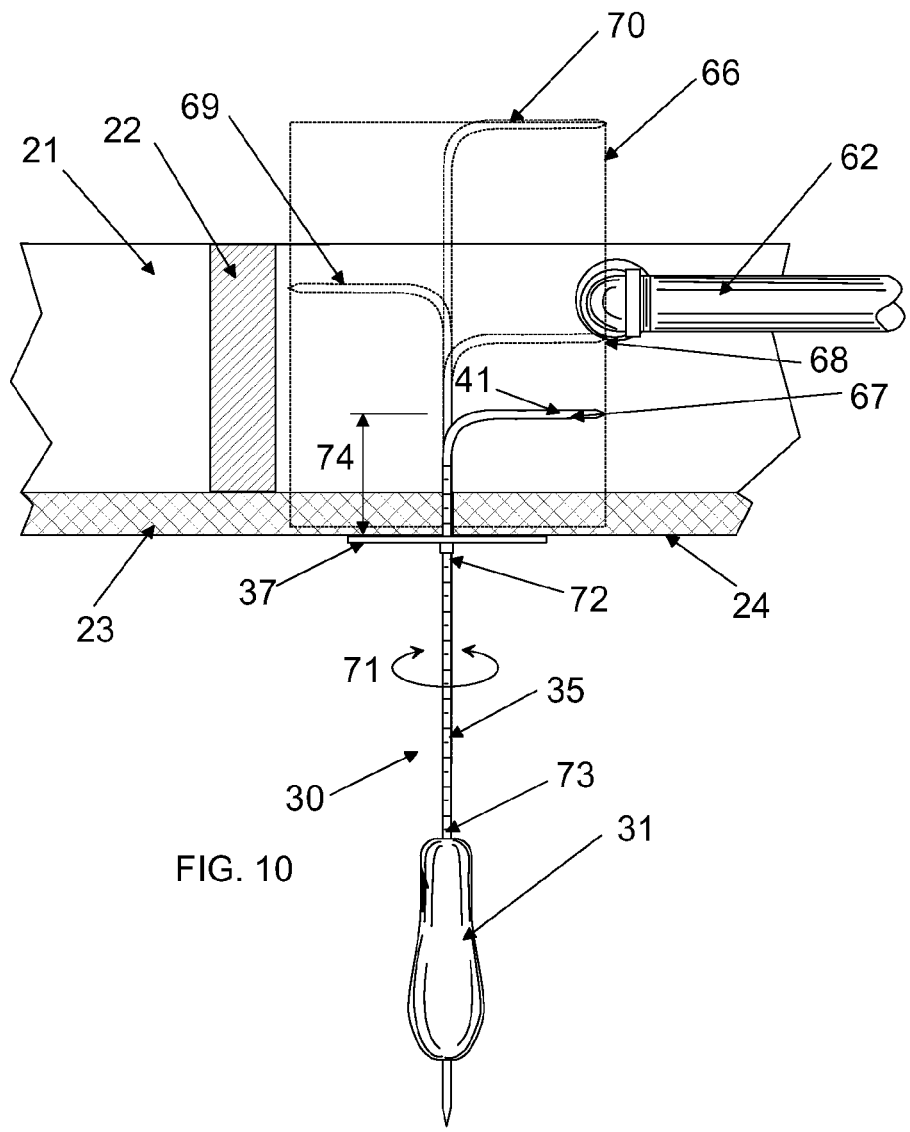
FIG. 10 is the view of FIG. 9 showing the invention probe in use.

FIG. 10 is the view of FIG. 9 showing the invention probe 30 in use at elevations 67, 68, 69 and 70 in installation space 66 (shown in broken lines). A user has inserted second section 41 into the insertion hole and now maintains the first section 35 perpendicular to underside 24 by upward pressure at handle 31 so that the top side of plate 37 is maintained flat against underside 24. At elevation 67, indicia 72 shows the measured elevation 74 to a user so that they appreciate the distance above underside 24 at which second section 41 is located for horizontal planar rotation for determination of interfering structures when a user rotates handle 31 in direction 71. It is clear from inspection that elevations 68 and 69 result in determination that interfering structure 62 intrudes into installation space 66 but that stud 22 does not. A user can, by mapping the shape of structure 62 through remote contact, determine the general shape, type and flexural characteristics of that structure. A user may decide to move to a different location for an insertion hole or may attempt to adapt a housing of fixture if the intrusion into the installation is space is acceptable for the intended use and illumination angle of the finally installed fixture. Elevation 70 may correspond to insertion of first section 35 to indicia 73 or first section 35 may extend to a length longer than a topmost elevation of the installation space 66. First and second sections are preferably made of a rigid material such as metal or plastic and have a diameter adapted to minimize damage to a ceiling covering due to forming of insertion holes.

The above design options will sometimes present the skilled designer with considerable and wide ranges from which to choose appropriate apparatus and method modifications for the above examples. However, the objects of the present invention will still be obtained by that skilled designer applying such design options in an appropriate manner.

I claim:

1. An installation space determination probe for retrofit recessed lighting fixtures comprising:
   (a) a handle adapted to be grasped for rotation by a user comprising a top end and bottom end defining a rotation axis, where a first section of a probe rod extends upward from the top end along the rotation axis and bearing along its length indicia of measurements of length and a second section of a probe rod extends perpendicular to the first section from its upper end;
   (b) an installation radius distance defined from the rotation axis to an end of the second section;
   (c) an installation space comprising a cylindrical space defined above an underside of a ceiling covering material whose height and diameter equal those of a housing of the retrofit recessed lighting fixture intended for installation therein, whereby the installation radius distance is one half of said installation space diameter; and
   (d) a normalization plate slidable along the length of the first section adapted to engage a top surface of the normalization plate with said underside of the ceiling covering material whereby the first section is maintained in a position parallel to said underside when a user impresses the first section through an installation hole in the ceiling covering material.

2. The probe of claim 1 wherein a length of the first section is equal to the height of installation space.

3. The probe of claim 1 wherein a hole forming pin extends downward from the bottom end of the handle, said hole forming pin being adapted to form a hole in the ceiling covering material.

4. The probe of claim 3 wherein the hole forming pin is pointed on a free end, is from one to two inches long, and is a rigid rod with a diameter equal to or less than 3 millimeters in diameter.

5. The probe of claim 4 wherein the hole forming pin comprises a cross section form in the shape of a plus sign or a Y-shape.

6. The probe of claim 1 wherein the second section comprises one or more terminal portion tips which are removable from a proximal portion extending from the top end of the first section.

7. The probe of claim 6 wherein a cylindrical sleeve comprises means for joining a terminal portion tip to the proximal portion.

8. The probe of claim 6 wherein three terminal portion tips comprise a kit, whereby each of said tips is of a different length.

9. The probe of claim 8 wherein each of said tips installed with said proximal portion results in installation radius distances equal to one half of one of three standard installation diameters for said recessed lighting fixtures.

10. The probe of claim 1 wherein the first section comprises one or more terminal portion tips which are removable from a proximal portion extending from the top end of the handle and said tips define second sections of variable lengths.

11. The probe of claim 1 wherein directional indicia are formed on the handle showing a direction of the second section when the second section is not visible located above the ceiling covering material.

12. The probe of claim 1 wherein the first and second sections are joined by an arcuate transition section.

13. The probe of claim 1 wherein the diameter of the first and second sections are less than 3 millimeters.

14. The probe of claim 1 wherein the diameter of the first and second sections are less than 2 millimeters.

15. The probe of claim 1 wherein it is sold as a kit and included with a single retrofit recessed lighting fixture.

\* \* \* \* \*